April 13, 1965   S. BALOGH   3,178,022
BI-DIRECTIONAL FILTER DRYER FOR REVERSE CYCLE HEAT PUMPS
Filed Jan. 22, 1962
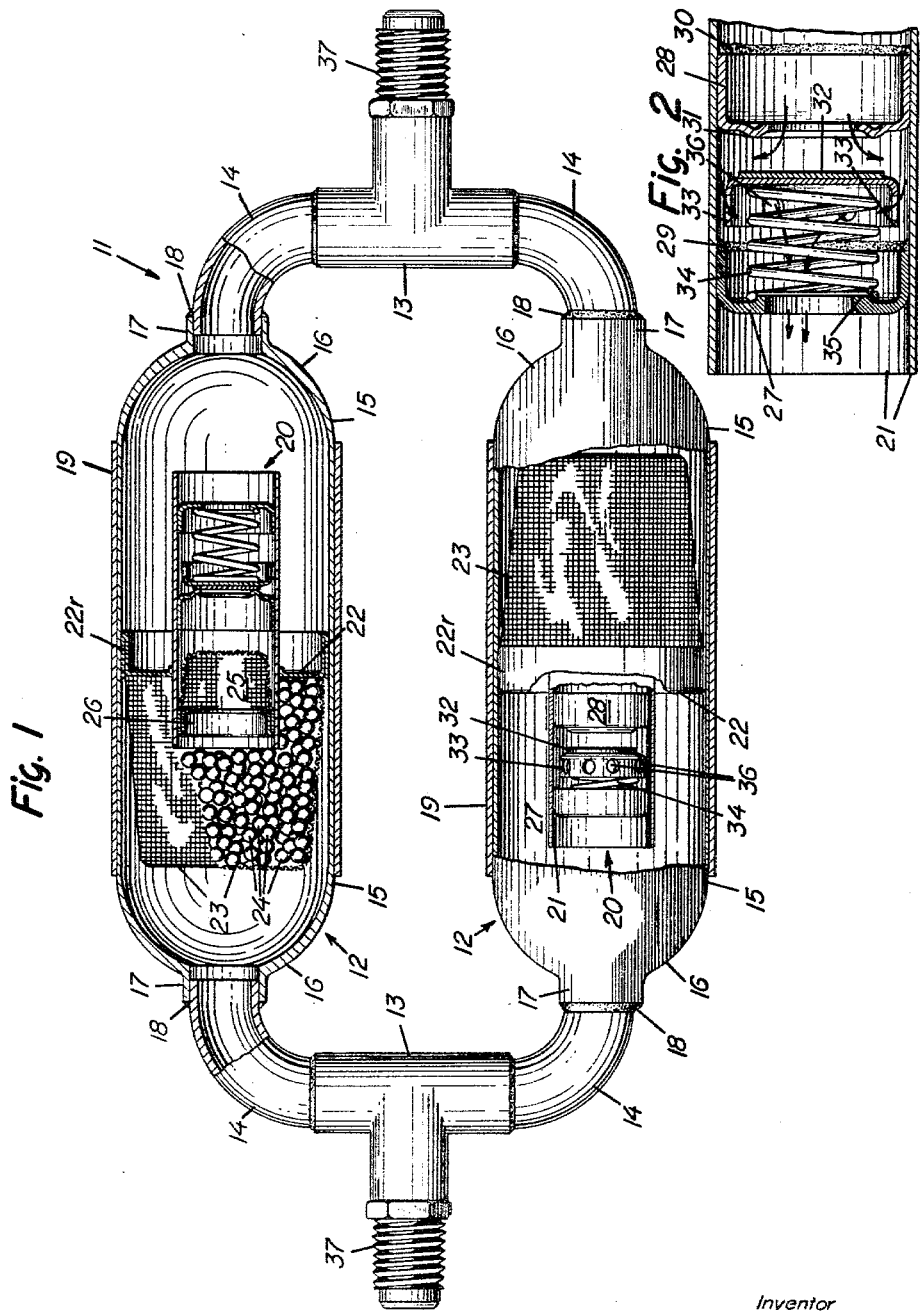
Inventor
Stephen Balogh
by *(signature)*
Attorney

United States Patent Office 3,178,022
Patented Apr. 13, 1965

3,178,022
BI-DIRECTIONAL FILTER DRYER FOR REVERSE CYCLE HEAT PUMPS
Stephen Balogh, Lyons, N.Y., assignor, by mesne assignments, to Parker-Hannifin Corporation, Cleveland, Ohio, a corporation of Ohio
Filed Jan. 22, 1962, Ser. No. 167,766
1 Claim. (Cl. 210—136)

This invention relates to a bi-directional filter dryer for reverse cycle heat pumps and it consists in the combinations, constructions and arrangements of parts hereinafter described and claimed.

Generally there is provided a pair of filter dryer units connected in parallel as a unitary assemblage by a pair of T couplings at their coterminous ends. Each unit comprises essentially (1) a cup-shaped screen serving as a filter for collecting foreign particles and as a holder for pellets of refrigerant drying material and (2) a check valve for permitting only unidirectional flow of the refrigerant therethrough. The two units are oppositely polarized so that only one thereof operates during flow of the refrigerant in one direction, while only the other unit functions during reverse cycle operation of the system.

In a heat pump reverse cycle system, the major problem encountered with a filter dryer is that when the cycle is reversed, the foreign particles collected on the screen thereof are washed off back into the system. With utilization of the present invention, the action of the built-in valves prevents refrigerant from passing through the same filter dryer when the system is reversed, thus eliminating the back washing problem encountered with a standard filter dryer.

It is accordingly an object of this invention to provide a bi-directional filter dryer assemblage comprising a pair of oppositely polarized units whereby backwash of foreign matter into the system is prevented on a reverse cycle of operation.

It is another object of the invention to provide a unitary assemblage of a pair of oppositely polarized unidirectional filter dryer units in which said units are connected in parallel by a pair of T couplers, one connecting the adjacent ends of the units at each end of the assemblage.

It is a further object of the present invention to provide an assemblage of the character described in which each unit includes a cup-shaped screen which serves both as a filter and as a holder for refrigerant drying pellets.

Other and further objects of the invention will become apparent from a reading of the following specification taken in conjunction with the drawing, in which:

FIGURE 1 is an elevational view, partly in axial section, of a preferred embodiment of the invention, and FIGURE 2 is an enlarged fragmentary elevational view of one of the check valves, in axial section.

With reference now to the drawing, the numeral 11 generally designates the unitary assemblage, which comprises a pair of identical filter dryer units 12 connected in oppositely polarized parallel arrangement by a pair of T's 13 and four L's 14, as shown.

Each unit 12 is formed of a pair of identical die-cast or molded cylindrical shells 15 each having an integral hemispherical end wall 16. Each end wall 16 is provided with an integral nipple 17 by which the unit 12 is coupled to one of the L's 14, as by a soldered or brazed joint 18. In the finished assemblage, the mating pairs of shells 15 forming each unit 12 are rigidly joined coaxially with their rims substantially abutted by a close fitting surrounding sleeve 19, soldered, brazed or otherwise fixed thereto.

Prior, however, to the final assemblage, a filter dryer unit generally designated 20 is inserted in the open end of one of the shells 12, with roughly half of the unit 20 protruding axially from said open end for extension into the chamber of the mating shell 15 when assembled therewith.

Each filter dryer unit 20 comprises a cylindrical sleeve 21 and a centrally apertured supporting disc 22 silver-soldered or otherwise fixed thereto. The supporting disc 22 has a two-ply flanged annular rim 22r, the laminae of which are crimped over the rim of a wire mesh strainer or filter cup 23. The cup 23 is filled or partly filled with absorbent material of known composition, preferably in the form of relatively hard pellets 24. The pellets 24 are confined to the filter cup 23 by a second smaller cup-shaped screen 25 closing the near end of the sleeve 21 and fixed therein by a press-fitted two-ply cylindrical ring 26, the rim of the screen 25 being gripped between the laminae of said ring.

A check valve controls the flow of refrigerant through each sleeve 21. Said valve comprises a pair of centrally apertured axially spaced cups 27 and 28 soldered to the sleeve 21 at 29 and 30, respectively. The cup 28 has a raised concentric annular bead 31 on its end wall to define a valve seat for cooperation with a valve disc 32 of any suitable somewhat resilient material. The disc 32 is cemented to the bottom of a movable cup 33 of lesser diameter than the inside diameter of the sleeve 21.

A coil spring 34 is compressed between the bottom wall of the movable cup 33 and the fixed cup 27, being held coaxially within their opposed concavities by an inwardly directed concentric flange 35 at the bottom of the cup 27. The side walls of the cup 27 are desirably apertured at 36 to reduce the flow resistance of said cup. The arrows in FIG. 2 indicate the direction of flow of the refrigerant, the valve being shown in its opened position effected by the pressure of said flow.

The free ends of the T's 13 are threaded at 37 for coupling by standard fittings into a conduit of a reverse cycle refrigeration system (not shown). When the refrigerant flows from right to left in FIG. 1, the valve of the upper unit 12 opens while that of the lower unit remains closed. Foreign particles are filtered out by the screen 23 of the upper unit and collect on its outer surface. When the refrigerant flows from right to left on the reverse cycle, the check valve of the upper unit closes and that of the lower unit opens, thus preventing washing of the filtered-out foreign matter back into the system.

While but one form of the invention has been shown and described herein, it will be readily apparent to those skilled in the art that many minor modifications may be made without departing from the spirit of the invention or the scope of the appended claim.

What is claimed is:

A bi-directional filter dryer unit for reverse cycle heat pumps, comprising: an elongated tubular member defining a first filter dryer chamber, a second elongated tubular member defining a second filter dryer chamber, said chambers having inlet and outlet ports at the ends thereof, and being arranged in parallel with the inlet port of one adjacent the outlet port of the other, a pair of branched conduit means including a common conduit and a branch extending to the inlet port of one elongated tubular member and a branch extending to the outlet port of the other elongated tubular member, the common conduits being aligned and extending in opposite directions for connecting the unit in a pipe line, filter means bridging each of said chambers transverse to the fluid flow path therethrough, a check valve associated with each chamber for preventing reverse fluid flow through said chamber, a mass of dryer material in each of said chambers, and foraminous barrier means positioned to prevent displacement of said dryer material in one direction in each said chamber, said filter means serving to prevent displacement of said dryer material in the other direction, the check valves, the barrier means and the filter means being disposed oppositely in the two chambers, said elongated tubular members each comprising a pair of axially elongated cup-shaped elements rigidly coaxially connected at their rims to form an hermetically sealed joint, and a sleeve snugly embracing said joint and extending coaxially over large areas of both of said cup-shaped elements adjacent the mating rims thereof, each of said check valves comprising an elongated tubular element, means supporting and peripherally sealing said tubular element longitudinally disposed in said chamber, said check valve being fixed within said elongated tubular member to control the flow of refrigerant fluid therethrough, said foraminous barrier means bridging and being fixed to the inlet portion of said tubular element for preventing fouling of said valve by said dryer material, and said filter means comprising a foraminous cup the rim of which is fixed to said means for supporting said tubular element, said last-mentioned means having a two-ply cylindrical rim gripping the rim of said foraminous cup therebetween.

References Cited by the Examiner

UNITED STATES PATENTS

| | | | |
|---|---|---|---|
| 511,757 | 1/94 | Criqui | 210—450 X |
| 2,134,413 | 10/38 | Munoz | 210—136 |
| 2,139,659 | 12/38 | Bijur | 210—446 X |
| 2,199,258 | 4/40 | Gray | 62—474 X |
| 2,580,764 | 1/52 | Gunz | 210—195 X |
| 2,686,596 | 8/54 | Storms. | |
| 2,702,993 | 3/55 | Harris | 62—474 X |
| 2,797,704 | 7/57 | McDermott et al. | |
| 3,098,819 | 7/63 | Sager | 210—97 |

FOREIGN PATENTS 603,135   8/60   Canada.

NORMAN YUDKOFF, *Primary Examiner*.
HERBERT L. MARTIN, *Examiner*.